United States Patent
Kusano et al.

(10) Patent No.: US 10,707,505 B2
(45) Date of Patent: Jul. 7, 2020

(54) FUEL CELL SYSTEM

(71) Applicant: TOYOTA JIDOSHA KABUSHIKI KAISHA, Toyota-shi, Aichi-ken (JP)

(72) Inventors: Yuya Kusano, Susono (JP); Hideaki Mizuno, Owariasahi (JP)

(73) Assignee: TOYOTA JIDOSHA KABUSHIKI KAISHA, Tokyo-shi, Aichi-ken (JP)

( * ) Notice: Subject to any disclaimer, the term of this patent is extended or adjusted under 35 U.S.C. 154(b) by 266 days.

(21) Appl. No.: 15/934,278

(22) Filed: Mar. 23, 2018

(65) Prior Publication Data

US 2018/0277869 A1  Sep. 27, 2018

(30) Foreign Application Priority Data

Mar. 27, 2017  (JP) .................................. 2017-061464
Jan. 15, 2018   (JP) .................................. 2018-004320

(51) Int. Cl.
| | | |
|---|---|---|
| H01M 8/24 | (2016.01) | |
| H01M 8/04 | (2016.01) | |
| H01M 8/0432 | (2016.01) | |
| H01M 8/04291 | (2016.01) | |
| H01M 8/04119 | (2016.01) | |
| H01M 8/0258 | (2016.01) | |

(Continued)

(52) U.S. Cl.
CPC ..... *H01M 8/04373* (2013.01); *H01M 8/0258* (2013.01); *H01M 8/0267* (2013.01); *H01M 8/04* (2013.01); *H01M 8/04029* (2013.01); *H01M 8/04089* (2013.01); *H01M 8/04164* (2013.01); *H01M 8/04291* (2013.01);

(Continued)

(58) Field of Classification Search
CPC ............. H01M 8/0432; H01M 8/0258; H01M 8/0267; H01M 8/04029; H01M 8/04089; H01M 8/24; H01M 8/04373
See application file for complete search history.

(56) References Cited

U.S. PATENT DOCUMENTS

| | | | |
|---|---|---|---|
| 2002/0045079 A1* | 4/2002 | Shimada | ................. C22C 38/40 429/434 |
| 2004/0151958 A1* | 8/2004 | Formanski | ........ H01M 8/04022 429/414 |

(Continued)

FOREIGN PATENT DOCUMENTS

| | | |
|---|---|---|
| JP | 2002-056865 A | 2/2002 |
| JP | 2002056865   * | 2/2002 |

(Continued)

OTHER PUBLICATIONS

JP 2006107969 MT (Year: 2006).*

(Continued)

*Primary Examiner* — Alexander Usyatinsky
(74) *Attorney, Agent, or Firm* — Sughrue Mion, PLLC

(57) ABSTRACT

A cathode gas cooling system provided with a heat exchanger having first internal channels into which cathode gas flows and second internal channels to which water discharged from a fuel cell is supplied and cooling cathode gas flowing through the first internal channels by latent heat of vaporization of water flowing through the second internal channels. The first internal channels and second internal channel are are respectively made independent channels inside the heat exchanger so that steam produced inside the second internal channels by heat exchange with cathode gas flowing through the first internal channels does not flow into the first internal channels.

3 Claims, 10 Drawing Sheets

(51) Int. Cl.
   *H01M 8/0267*   (2016.01)
   *H01M 8/04029*  (2016.01)
   *H01M 8/04089*  (2016.01)
   *F28D 21/00*    (2006.01)

(52) U.S. Cl.
   CPC ....... *H01M 8/24* (2013.01); *F28D 2021/0043* (2013.01); *F28D 2021/0061* (2013.01); *H01M 2250/20* (2013.01)

(56) References Cited

U.S. PATENT DOCUMENTS

2006/0257704 A1* 11/2006 Ogino ................ H01M 8/1231
                                                    429/411
2009/0214915 A1*  8/2009 Kwon ................. H01M 8/0258
                                                    429/437

FOREIGN PATENT DOCUMENTS

| JP | 2004168187   | * | 6/2004 |
| JP | 2006107969   | * | 4/2006 |
| JP | 2009-200026 A |   | 9/2009 |
| JP | 2014-150055 A |   | 8/2014 |
| JP | 201855931 A  |   | 4/2018 |

OTHER PUBLICATIONS

JP 2004168187 MT (Year: 2004).*
20180031859,Written_Decision_on_Registration_(Translated), dated Mar. 31, 2019 (Year: 2019).*

* cited by examiner

FUEL CELL SYSTEM

CROSS-REFERENCE TO RELATED APPLICATION

This application claims priority based on Japanese Patent Application No. 2017-061464 filed with the Japan Patent Office on Mar. 27, 2017, and Japanese Patent Application No. 2018-004320 filed with the Japan Patent Office on Jan. 15, 2018, the entire contents of which are incorporated into the present specification by reference.

TECHNICAL FIELD

The present disclosure relates to a fuel cell system.

BACKGROUND ART

JP2002-056865A discloses a conventional fuel cell system configured so as to pass cathode off-gas discharged from a fuel cell through a turbine of a turbocharger so as to cool it by adiabatic expansion and exchange heat between that cooled cathode off-gas and cathode gas compressed by a compressor and becoming a high temperature so as to thereby cool the cathode gas supplied to the fuel cell.

SUMMARY OF DISCLOSURE

However, the above-mentioned conventional fuel cell system exchanged heat between one gas and another, so was poor in heat exchange efficiency and was liable to not sufficiently cool the cathode gas. For this reason, the fuel cell was liable to be supplied with relatively high temperature cathode gas, so the load when cooling the fuel cell itself was liable to increase and the cooling performance of the fuel cell system was liable to fall.

The present disclosure was made focusing on this problem. It has as its object to efficiently cool cathode gas while suppressing a drop in cooling performance of the fuel cell system as a whole.

To solve the above problem, according to one aspect of the present disclosure, there is provided a fuel cell system comprising a fuel cell, a compressor for compressing cathode gas and supplying it to the fuel cell, and a cathode gas cooling system for cooling cathode gas before being compressed by the compressor and supplied to the fuel cell, wherein the cathode gas cooling system comprises a heat exchanger having first internal channels into which cathode gas flows and second internal channels in which water discharged from the fuel cell is supplied and using the latent heat of vaporization of the water flowing through the second internal channels to cool the cathode gas flowing through the first internal channels and discharging it from the first internal channels, the first internal channels and second internal channels respectively being made independent channels inside the heat exchanger so that steam produced inside the second internal channels due to heat exchange with the cathode gas flowing through the first internal channels does not flow into the first internal channels.

According to this aspect of the present disclosure, it is possible to efficiently cool cathode gas while suppressing a drop in cooling performance of the fuel cell system as a whole.

DESCRIPTION OF EMBODIMENTS

Figure 1:
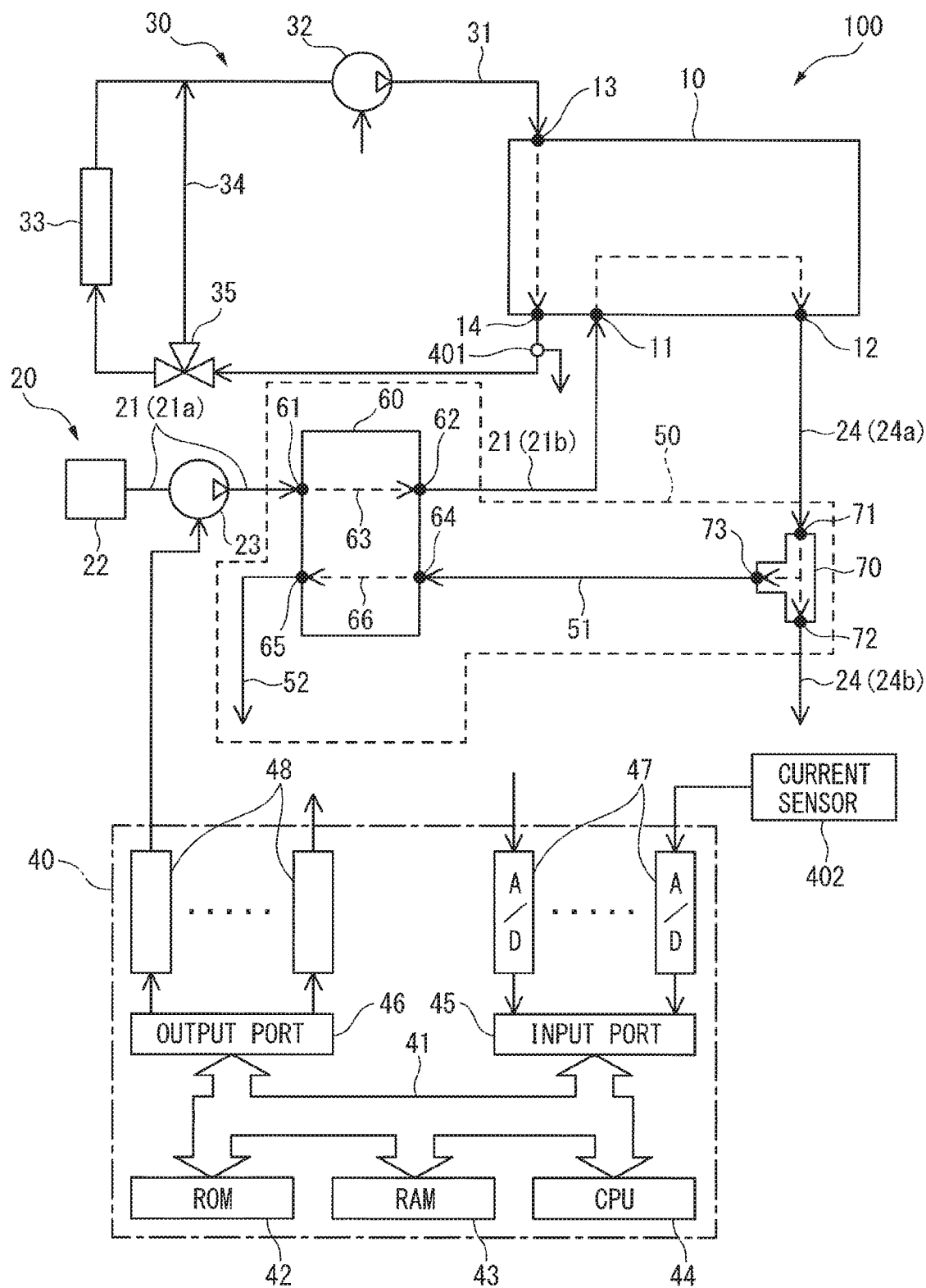
FIG. 1 is a schematic view of the configuration of a fuel cell system according to a first embodiment of the present disclosure.

Below, referring to the drawings, embodiments of the present disclosure will be explained in detail. Note that, in the following explanation, similar components are assigned the same reference numerals.

First Embodiment

FIG. 1 is a schematic view of the configuration of a fuel cell system 100 according to a first embodiment of the present disclosure.

The fuel cell system 100 comprises a fuel cell stack 10, a cathode gas supply/discharge system 20 for supplying and discharging cathode gas (oxidizing agent gas) to and from the fuel cell stack 10, a refrigerant circulation system 30 for circulating a refrigerant cooling the fuel cell stack 10 (for example, a "long life coolant" (LLC)), and an electronic control unit 40. Note that, in FIG. 1, an anode gas supply/discharge system for supplying and discharging anode gas (fuel gas) to and from the fuel cell stack 10 and various electrical components electrically connected to an output terminal of the fuel cell stack 10 are not major parts of the present disclosure, so illustrations are omitted.

The fuel cell stack 10 is formed by stacking a plurality of fuel cell unit cells (below, referred to as "unit cells") and connecting the unit cells electrically in series. The fuel cell stack 10 receives the supply of anode gas containing hydrogen and cathode gas containing oxygen to generate electric power and supplies the generated electric power to various electrical components such as a motor required for example for driving a vehicle. In the present embodiment, hydrogen is used as the anode gas, while air is used as the cathode gas.

The cathode gas supply/discharge system 20 comprises a cathode gas supply passage 21, an air cleaner 22, a cathode compressor 23, a cathode off-gas discharge passage 24, and a cathode gas cooling system 50 for cooling the cathode gas. Below, the air cleaner 22 side will be defined as "upstream" in explaining details of the different component parts of the cathode gas supply/discharge system 20.

The cathode gas supply passage 21 is a passage through which cathode gas constituted by air is supplied to the fuel cell stack 10 and is comprised of an upstream side supply pipe 21a and a downstream side supply pipe 21b.

The upstream side supply pipe 21a is a pipe which is connected at one end to an air cleaner 22 and which is connected at the other end to a high temperature gas inlet part 61 of a later explained intercooler 60. The downstream side supply pipe 21b is a pipe which is connected at one end to a low temperature gas outlet part 62 of the later explained intercooler 60 and which is connected at the other end to a cathode gas inlet part 11 of the fuel cell stack 10.

The air cleaner 22 is arranged in the atmosphere and removes foreign matter in the air sucked into the upstream side supply pipe 21a.

The cathode compressor 23 is, for example, a centrifugal type or axial flow type of turbocompressor and is provided at the upstream side supply pipe 21a. The cathode compressor 23 compresses and discharges air sucked into the upstream side supply pipe 21a through the air cleaner 22.

The cathode off-gas discharge passage 24 is a passage through which cathode off-gas discharged from the fuel cell stack 10 flows and comprises an upstream side discharge pipe 24a and a downstream side discharge pipe 24b. The cathode off-gas is a mixed gas of excess oxygen which was not used for the electrochemical reaction inside the fuel cell stack 10 and nitrogen or another inert gas. The cathode off-gas contains moisture produced by the electrochemical reaction (water and steam).

The upstream side discharge pipe 24a is a pipe which is connected at one end to a cathode off-gas outlet part 12 of the fuel cell stack 10 and which is connected at the other end to a gas inflow port 71 of a later explained gas-liquid separator 70. The downstream side discharge pipe 24b is a pipe which is connected at one end to a gas outflow port 72 of the later explained gas-liquid separator 70 and which is open at the other end to the atmosphere.

The cathode gas cooling system 50 according to the present embodiment comprises an intercooler 60, gas-liquid separator 70, discharged water supply pipe 51, and steam discharge pipe 52.

The intercooler 60 is a heat exchanger configured so as to utilize the latent heat of vaporization when making a liquid evaporate so as to cool high temperature gas (gas). As such a heat exchanger, for example, an evaporator may be mentioned. The intercooler 60 according to the present embodiment comprises a high temperature gas inlet part 61, low temperature gas outlet part 62, first internal channels 63 connecting the high temperature gas inlet part 61 and low temperature gas outlet part 62, discharged water inlet part 64, steam outlet part 65, and second internal channels 66 connecting the discharged water inlet part 64 and steam outlet part 65 and is configured to be able to utilize the latent heat of vaporization of the water generated due to the electrochemical reaction between the hydrogen and oxygen in the fuel cell stack 10 so as to cool the air compressed by the cathode compressor 23 and becoming high in temperature (below, referred to as "compressed air").

Figure 2:
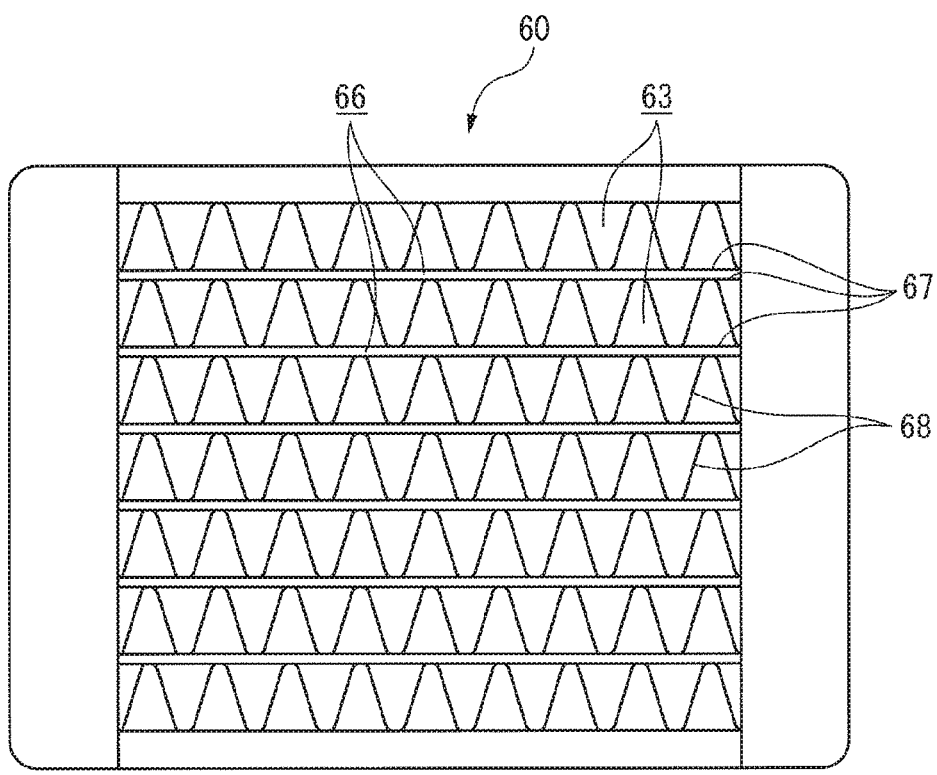
FIG. 2 is a schematic cross-sectional view showing an inside of an intercooler.

FIG. 2 is a schematic cross-sectional view showing the inside of this intercooler 60 according to the present embodiment.

As shown in FIG. 2, inside of the intercooler 60, pluralities of first internal channels 63 and second internal channels 66 are alternately formed in the vertical direction in the figure by being partitioned by the partitions 67 and are designed to conduct the heat of compressed air flowing through the first internal channels 63 through the partitions 67 to the water inside the second internal channels 66.

Further, the first internal channels 63 and second internal channels 66 form independent channels so that steam produced inside the second internal channels 66 due to heat exchange with the compressed air flowing through the first internal channels 63 does not flow into the first internal channels 63. That is, the steam produced inside the second internal channels 66 is not used for humidifying the cathode gas inside of the intercooler 60, but is discharged from the second internal channels 66 to outside the intercooler 60.

In the present embodiment, the first internal channels 63 and second internal channels 66 are made straight shapes extending in parallel from the front side of the sheet on which the figure is drawn toward the back side of the sheet. However, the first internal channels 63 and second internal channels 66 are not particularly limited in channel shapes so long as shapes enabling heat exchange between the compressed air and water. For example, they may be U-shaped as well.

The first internal channels 63 are designed so that cathode gas supplied from the high temperature gas inlet part 61 (see FIG. 1) to the inside of the intercooler 60 flows into them substantially evenly distributed. In the example shown in FIG. 2, the compressed air flows from the front side of the sheet on which the figure is drawn toward the back side of the sheet through the first internal channels 63. Further, the first internal channels 63 are formed with pluralities of fins 68 extending from the partitions 67 and are designed to be able to conduct the heat of the compressed air efficiently through the fins 68 to the partitions 67.

The second internal channels 66 are designed so that the water flowing in from the discharged water inlet part 64 (see FIG. 1) to the inside of the intercooler 60 is substantially evenly distributed and supplied to them. The water supplied to the second internal channels 66 boils due to heat exchange with the compressed air through the partitions 67 and becomes steam. In the example shown in FIG. 2, this steam is designed to flow from the back side of the sheet on which the figure is drawn toward the front side of the sheet through the second internal channels 66 to be discharged from the steam outlet part 65. In this way, in the present embodiment, compressed air and steam flow against each other inside the intercooler 60, but the disclosure is not limited to this. They may also be designed to flow in the same direction.

If the compressed air flows inside the first internal channels 63, the heat of the compressed air is conducted to the partitions 67 and the partitions 67 rise in temperature. If the temperature of the partitions 67 exceeds the boiling point of the water flowing through the second internal channels 66, the water inside the second internal channels 66 adjacent to the partitions 67 boils. It is possible to keep the temperature rise of the partitions 67 due to the latent heat of vaporization at that time down to a certain temperature. That is, it is possible to maintain the temperature of the partitions 67 at a temperature lower than the compressed air, specifically, a temperature near the boiling point of water. For this reason, it is possible to maintain the temperature difference between the compressed air and partitions 67 at a certain temperature difference and possible to conduct the heat of the compressed air continuously and efficiently to the partitions 67 to cool the compressed air.

In the present embodiment, the temperature of the compressed air flowing into the first internal channels 63 is generally 300° C., while the boiling point of the water flowing through the second internal channels 66 is generally 100° C. Therefore, in the present embodiment, due to the intercooler 60, it is possible to make the temperature of the compressed air flowing into the first internal channels 63 fall to generally 100° C. to make it flow out from the low temperature gas outlet part 62. Note that, for example, it is also possible to configure the cathode gas cooling system 50 so as to provide the discharged water supply pipe 51 with a pressure reducing pump etc. to control the pressure inside the second internal channels 66 and change the boiling point of the water. By configuring the disclosure in this way, it is possible to adjust the temperature of the cathode gas flowing out from the low temperature gas outlet part 62.

Returning to FIG. 1, the gas-liquid separator 70 comprises a gas inflow port 71, gas outflow port 72, and discharged water outflow port 73. The gas-liquid separator 70 separates water from the cathode off-gas which had flowed from the gas inflow port 71 to the inside, discharges the separated water from the discharged water outflow port 73, and discharges the cathode off-gas from which the water was separated from the gas outflow port 72.

The discharged water supply pipe 51 is a pipe which is connected at one end to the discharged water outflow port 73 of the gas-liquid separator 70 and which is connected at the other end to the discharged water inlet part 64 of the intercooler 60. The water in the cathode off-gas which was separated by the gas-liquid separator 70 flows through this discharged water supply pipe 51 and is supplied from the discharged water inlet part 64 of the intercooler 60 to the second internal channels 66 inside the intercooler 60.

The steam discharge pipe 52 is a pipe which is connected at one end with a steam outlet part 65 of the intercooler 60 and which is opened at the other end to the atmosphere. Steam inside the second internal channels 66 produced due to heat exchange with the compressed air inside the intercooler 60 is discharged through the steam discharge pipe 52 to the outside of the fuel cell system 100 (in the present embodiment, the atmosphere).

In this way, the cathode gas cooling system 50 according to the present embodiment is configured so that air flows to the first internal channels 63 inside the intercooler 60 and water produced due to the electrochemical reaction inside the fuel cell stack 10 is supplied to the second internal channels 66. Further, the intercooler 60 is configured so that the latent heat of vaporization of water supplied to the second internal channels 66 is used to cool the air flowing through the first internal channels 63.

By using the heat of the air flowing through the first internal channels 63 in this way as heat for changing water in phase to steam, for example it is possible to raise the efficiency of heat exchange compared with the case of performing heat exchange with the air flowing through the first internal channels 63 without making the phase change. For this reason, it is possible to improve the cooling performance of the intercooler 60.

Further, the cathode gas cooling system 50 according to the present embodiment makes the first internal channels 63 and second internal channels 66 inside the intercooler 60 respectively independent channels and is configured to not use steam produced in the second internal channels 66 for humidifying the cathode gas but to enable the steam to be discharged to the steam discharge pipe 52 and released to the outside air.

Here, if the steam produced by heat exchange with the air flowing through the first internal channels 63 ends up merging with the air, which flows through the first internal channels 63 inside the intercooler 60 and then is cooled, for humidifying the cathode gas, the heat robbed from the air will end up being again returned to the air and as a result the temperature of the fuel cell stack 10 to which that air is supplied will easily rise. This being so, a need would arise to increase the circulation flow rate of the refrigerant cooling the fuel cell stack 10 and therefore the load of the later explained refrigerant pump 32 would increase. As a result, the cooling efficiency of the fuel cell stack 10 would be liable to fall and the cooling performance of the fuel cell system 100 as a whole would be liable to drop.

As opposed to this, the cathode gas cooling system 50 according to the present embodiment is, in view of this finding, configured to not use the steam produced inside the second internal channels 66 for humidifying the cathode gas, but to discharge it to the steam discharge pipe 52 and release it to the outside air. For this reason, it is possible to improve the cooling performance of the intercooler 60 while improving the cooling performance of the fuel cell system 100 as a whole.

The refrigerant circulation system 30 comprises a refrigerant circulation pipe 31, refrigerant pump 32, radiator 33, radiator bypass pipe 34, and bypass control valve 35.

The refrigerant circulation pipe 31 is a pipe which circulates the refrigerant for cooling the fuel cell stack 10 and is connected at one end to the refrigerant inlet part 13 of the fuel cell stack 10 and at the other end to the refrigerant outlet part 14 of the fuel cell stack 10. Below, the refrigerant outlet part 14 side will be defined as "upstream of the refrigerant circulation pipe 31", while the refrigerant inlet part 13 side will be defined as "downstream of the refrigerant circulation pipe 31" in the explanation.

The refrigerant pump 32 is provided at the downstream side of the refrigerant circulation pipe 31 and circulates the refrigerant.

The radiator 33 is provided in the refrigerant circulation pipe 31 upstream from the refrigerant pump 32 and cools the refrigerant flowing out from the refrigerant outlet part 14 to the refrigerant circulation pipe 31, that is, the refrigerant used for cooling the fuel cell stack 10 and becoming a relatively high temperature, for example, by outside air flow or air sucked in by a radiator fan (not shown).

The radiator bypass pipe 34 is a pipe provided so as to circulate the refrigerant without making it pass through the radiator 33 and is connected at one end to the bypass control valve 35 and connected at the other end to the refrigerant circulation pipe 31 between the radiator 33 and refrigerant pump 32.

The bypass control valve 35 is, for example, a thermostat and is provided in the refrigerant circulation pipe 31 upstream from the radiator 33. The bypass control valve 35 switches the circulation path of the refrigerant in accordance with the temperature of the refrigerant. Specifically, when the temperature of the refrigerant is higher than a preset reference temperature, the refrigerant circulation path is switched so that the refrigerant flowing out from the refrigerant outlet part 14 to the refrigerant circulation pipe 31 passes through the radiator 33 and flows from the refrigerant inlet part 13 to the inside of the fuel cell stack 10. Conversely, when the temperature of the refrigerant is a reference temperature or less, the refrigerant circulation path is switched so that the refrigerant flowing out from the refrigerant outlet part 14 to the refrigerant circulation pipe 31 does not pass through the radiator 33 but flows through the radiator bypass pipe 34 to flow from the refrigerant inlet part 13 to the inside of the fuel cell stack 10.

The refrigerant circulation pipe 31 is provided near the refrigerant outlet part 14 upstream from the bypass control valve 35 with a water temperature sensor 401. The water temperature sensor 401 detects the temperature of the refrigerant flowing out from the refrigerant outlet part 14 to the refrigerant circulation pipe 31. The refrigerant pump 32 is controlled by a control signal from the electronic control unit 40 so that the temperature of the refrigerant detected by this water temperature sensor 401 becomes a predetermined target temperature (for example 60° C.).

The electronic control unit 40 is comprised of a digital computer provided with components connected with each other by a bidirectional bus 41 such as a ROM (read only memory) 42, RAM (random access memory) 43, CPU (microprocessor) 44, input port 45, and output port 46.

The input port 45 receives as input output signals of a current sensor 402 for detecting the current taken out from the fuel cell stack 10 (below, referred to as the "stack output current") etc. in addition to the above-mentioned water temperature sensor 401 through the corresponding AD converters 47. The stack output current detected by this current sensor 402 corresponds to the load of the fuel cell stack 10.

To the output port 46, various controlled parts such as the cathode compressor 23 and the refrigerant pump 32 are electrically connected through the corresponding drive circuits 48.

In this way, the input port 45 receives as input the output signals of the various sensors required for controlling the fuel cell system 100. The electronic control unit 40 outputs control signals for controlling the various controlled parts from the output port 46 based on the output signals of the various sensors input to the input port 45.

The fuel cell system 100 according to the present embodiment explained above comprises a fuel cell stack 10 (fuel cell), a cathode compressor 23 for compressing the cathode gas and supplying it to the fuel cell stack 10 (compressor), and a cathode gas cooling system 50 for cooling the cathode gas before it is compressed by the cathode compressor 23 and supplied to the fuel cell stack 10.

Further, the cathode gas cooling system 50 comprises an intercooler 60 (heat exchanger) having first internal channels 63 into which cathode gas flows and second internal channels 66 to which water discharged from the fuel cell stack 10 is supplied and using the latent heat of vaporization of the water flowing through the second internal channels 66 to cool the cathode gas flowing through the first internal channels 63 and cause it to flow out from the first internal channels 63 and is configured to not use the steam flowing inside the second internal channels 66 produced by heat exchange with the cathode gas flowing through the first internal channels 63 for humidifying the cathode gas but discharge it to the atmosphere.

Specifically, the first internal channels 63 and second internal channels 66 are made mutually independent channels inside the intercooler 60 (heat exchanger) so that the steam produced inside the second internal channels 66 due to the heat exchange with the cathode gas flowing through the first internal channels 63 does not flow into the first internal channels 63. Further, the cathode gas cooling system 50 is configured further comprising a gas-liquid separator 70 separating the water in the cathode off-gas discharged from the fuel cell stack 10, a discharged water supply pipe 51 (water supply passage) for supplying the water separated by the gas-liquid separator 70 to the second internal channels 66, and a steam discharge pipe 52 (steam discharge passage) for releasing into the atmosphere the steam produced inside the second internal channels 66 due to heat exchange with the cathode gas flowing through the first internal channels 63.

Due to this, it is possible to use the heat of the air flowing through the first internal channels 63 as the heat for changing the water in phase to steam, so, for example, compared to when exchanging heat with the air flowing through the first internal channels 63 without changing the phase, it is possible to raise the efficiency of heat exchange. For this reason, it is possible to improve the cooling performance of the intercooler 60.

Further, the system is configured to not use the steam produced inside the second internal channels 66 for humidifying the cathode gas but to discharge it to the steam discharge pipe 52 and release it to the outside air, so the heat robbed from the cathode gas inside the first internal channels 63 is never returned again to the cathode gas supplied to the fuel cell stack 10. For this reason, it is possible to improve the cooling performance of the intercooler 60 to efficiently cool the cathode gas while keeping down the drop in cooling efficiency of the fuel cell stack 10 to keep down the fall in cooling performance of the fuel cell system 100 as a whole.

Second Embodiment

Next, a second embodiment of the present disclosure will be explained. The present embodiment differs from the first embodiment on the point of configuring the cathode gas cooling system 50 so as to enable part of the refrigerant circulating through the refrigerant circulation pipe 31 to be supplied to the intercooler 60 to cool the compressed air. Below, this point of difference will be focused on in the explanation.

Figure 3:
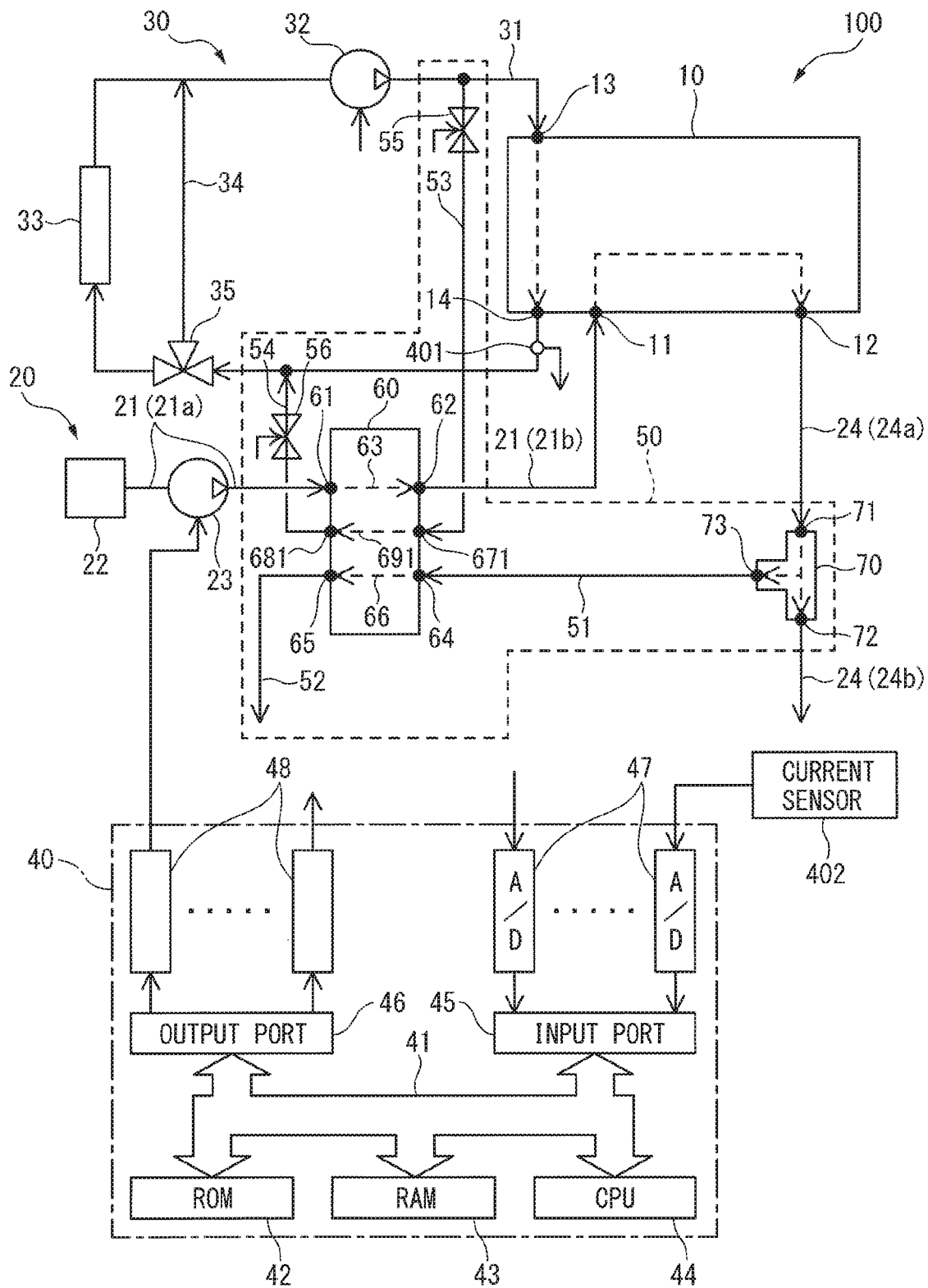
FIG. 3 is a schematic view of the configuration of a fuel cell system according to a second embodiment of the present disclosure.

FIG. 3 is a schematic view of the configuration of a fuel cell system 100 according to the present embodiment.

The fuel cell system 100 makes the refrigerant circulate to cool the fuel cell stack 10 by using the radiator 33 to cool the relatively high temperature refrigerant discharged from the fuel cell stack 10. For this reason, the radiator 33 used is one having a cooling performance enabling the fuel cell stack 10 to be sufficiently cooled even if the load of the fuel cell stack 10 is a high load.

Therefore, when the load of the fuel cell stack 10 is a low load, compared to when it is a high load, this is a state where there is extra leeway in the ability of the radiator 33 to cool the refrigerant.

On the other hand, when the load of the fuel cell stack 10 is a low load, the amount of water produced due to the electrochemical reaction becomes smaller than when it is a high load. For this reason, when the load of the fuel cell stack 10 is a low load, compared to when it is a high load, the amount of the water able to be supplied to the second internal channels 66 of the intercooler 60 becomes smaller, so the cooling performance of compressed air by the intercooler 60 falls.

Therefore, in the present embodiment, the cathode gas cooling system 50 was configured so as to be able to supply part of the refrigerant circulating through the refrigerant circulation pipe 31 to the intercooler 60 as well in accordance with the load of the fuel cell stack 10. Due to this, when the load of the fuel cell stack 10 is a low load, it is possible to supply refrigerant circulating through the refrigerant circulation pipe 31 to the intercooler 60 as well so as to keep the cooling performance of the intercooler 60 from falling at the time of a low load. Further, when load of the fuel cell stack 10 is a high load, it is possible to stop the supply of refrigerant circulating through the refrigerant circulation pipe 31 to the intercooler 60 so as to prevent the cooling of the fuel cell stack 10 from ending up becoming insufficient.

Below, referring to FIG. 3, the detailed configuration of the fuel cell system 100 according to the present embodiment will be explained.

As shown in FIG. 3, the intercooler 60 according to the present embodiment comprises, in addition to the high temperature gas inlet part 61, low temperature gas outlet part 62, first internal channels 63, discharged water inlet part 64, steam outlet part 65, and second internal channels 66, an intercooler use refrigerant inlet part 671, intercooler use refrigerant outlet part 681, and third internal channels 691 connecting the intercooler use refrigerant inlet part 671 and intercooler use refrigerant outlet part 681. It is configured so as to be able to cool the compressed air flowing through the first internal channels 63 by heat exchange with the refrigerant flowing through the third internal channels 691 as well. At this time, the refrigerant flowing through the third internal channels 691, unlike the water flowing through the second internal channels 66, is discharged, without changing in phase, as a liquid from the intercooler use refrigerant outlet part 681. Note that the third internal channels 691 are also made channels independent from the first internal channels 63 and second internal channels 66.

Further, the cathode gas cooling system 50 according to the present embodiment comprises, in addition to the intercooler 60, gas-liquid separator 70, discharged water supply pipe 51, and steam discharge pipe 52, a refrigerant supply pipe 53, refrigerant discharge pipe 54, first flow rate control valve 55, and second flow rate control valve 56.

The refrigerant supply pipe 53 is a pipe which branches off part of the refrigerant, before being discharged from the refrigerant pump 32 and flowing into the fuel cell stack 10, from the refrigerant circulation pipe 31 and supplies it to the intercooler 60. The refrigerant supply pipe 53 is connected at one end with the refrigerant circulation pipe 31 downstream from the refrigerant pump 32 and is connected at the other end to an intercooler use refrigerant inlet part 671 of the intercooler 60.

The refrigerant discharge pipe 54 is a pipe for returning the refrigerant becoming a relatively high temperature due to heat exchange with the compressed air and discharged from the intercooler 60 to the refrigerant circulation pipe 31. The refrigerant discharge pipe 54 is connected at one end to the intercooler use refrigerant outlet part 681 of the intercooler 60, while is connected at the other end to the refrigerant circulation pipe 31 upstream from the bypass control valve 35.

The first flow rate control valve 55 is provided at the refrigerant supply pipe 53. The first flow rate control valve 55 is opened when the load of the fuel cell stack 10 is a low load and controls the flow rate of refrigerant flowing into the refrigerant supply pipe 53. On the other hand, the first flow rate control valve 55 is closed when the load of the fuel cell stack 10 is a high load and prevents the inflow of refrigerant to the refrigerant supply pipe 53. The opening degree of the first flow rate control valve 55 is controlled by the electronic control unit 40.

The second flow rate control valve 56 is provided at the refrigerant discharge pipe 54. The second flow rate control valve 56 is opened together with the first flow rate control valve 55 when the load of the fuel cell stack 10 is a low load and controls the flow rate of the refrigerant flowing into the refrigerant supply pipe 53. On the other hand, the second flow rate control valve 56 is closed when the load of the fuel cell stack 10 is a high load and prevents the refrigerant flowing through the refrigerant circulation pipe 31 from flowing back to the refrigerant discharge pipe 54. The opening degree of the second flow rate control valve 56 is controlled by the electronic control unit 40.

Next, referring to FIG. 4, the control for supply of refrigerant to the intercooler 60 according to the present embodiment will be explained.

Figure 4:
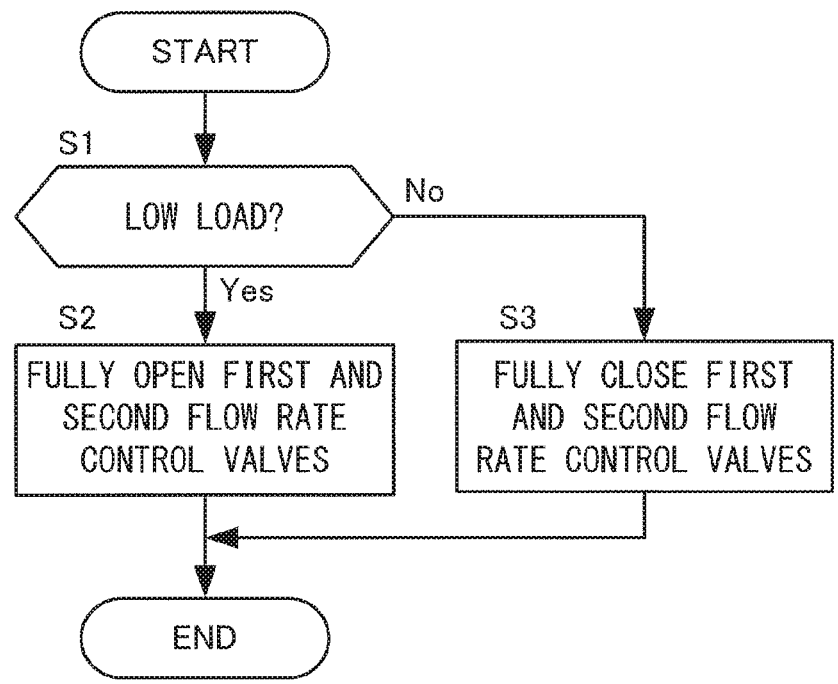
FIG. 4 is a flow chart for explaining control for supplying a refrigerant to the intercooler according to the second embodiment of the present disclosure.

FIG. 4 is a flow chart for explaining control of the supply of refrigerant to the intercooler 60 according to the present embodiment by the electronic control unit 40.

At step S1, the electronic control unit 40 judges if the load of the fuel cell stack 10 is a low load. Specifically, the electronic control unit 40 judges if the stack output current detected by the current sensor 402 is less than a predetermined value. The electronic control unit 40 judges that the load of the fuel cell stack 10 is a low load and proceeds to the processing of step S2 if the stack output current is less than a predetermined value. On the other hand, the electronic control unit 40 judges that the load of the fuel cell stack 10 is a high load and proceeds to the processing of step S3 if the stack output current is the predetermined value or more.

At step S2, the electronic control unit 40 fully opens the first flow rate control valve 55 and second flow rate control valve 56.

At step S3, the electronic control unit 40 fully closes the second flow rate control valve 56 and second flow rate control valve 56.

Note that, in the present embodiment, when the stack output current is less than a predetermined value, the first flow rate control valve 55 and second flow rate control valve 56 are set fully open, but the disclosure is not limited to this. For example, the opening degrees of the first flow rate control valve 55 and second flow rate control valve 56 may also be controlled so that the smaller the stack output current from a predetermined value, the larger the opening degrees of the first flow rate control valve 55 and second flow rate control valve 56 become. That is, it is also possible to variably control the opening degrees of the first flow rate control valve 55 and second flow rate control valve 56 in accordance with the load of the fuel cell stack 10.

The fuel cell system 100 according to the present embodiment explained above further comprises a refrigerant circulation pipe 31 (refrigerant circulation passage) through which refrigerant cooling the fuel cell stack 10 (fuel cell) circulates and a radiator 33 provided at the refrigerant circulation pipe 31 and cooling the refrigerant.

Further, the cathode gas cooling system 50 is configured to supply part of the refrigerant circulating through the refrigerant circulation pipe 31 to the third internal channels 691 formed inside of the intercooler 60 (heat exchanger) and to cool the cathode gas flowing through the first internal channels 63 by the refrigerant flowing through the third internal channels 691 as well.

Specifically, the cathode gas cooling system 50 comprises a refrigerant supply pipe 53 and refrigerant discharge pipe 54 (branch passages) branched from the refrigerant circulation pipe 31 and communicating with the third internal channels 691, a first flow rate control valve 55 and second flow rate control valve 56 (flow rate control valves) provided at the refrigerant supply pipe 53 and refrigerant discharge pipe 54, and an electronic control unit 40 (control device) controlling the opening degrees of the first flow rate control valve 55 and second flow rate control valve 56 so as to control the flow rate of the refrigerant supplied to the third internal channels 691 based on the load of the fuel cell stack 10. Further, the electronic control unit 40 is configured so as to make the opening degrees of first flow rate control valve 55 and second flow rate control valve 56 larger than fully closed when the load of the fuel cell stack 10 is less than a predetermined load.

Due to this, when the load of the fuel cell stack 10 is a low load less than a predetermined load, the refrigerant circulating through the refrigerant circulation pipe 31 can be supplied to the intercooler 60 as well, so it is possible to suppress a drop in the cooling performance of the intercooler 60 at the time of a low load. Note that by configuring the electronic control unit 40 so as to enlarge the opening degrees of the first flow rate control valve 55 and second flow rate control valve 56 (flow rate control valves) as the load becomes lower when the load of the fuel cell stack 10 is less than a predetermined load, it is possible to more effectively suppress the drop in the cooling performance of the intercooler 60.

Third Embodiment

Next, a third embodiment of the present disclosure will be explained. The present embodiment differs from the first embodiment on the point of configuring the cathode gas cooling system 50 so as to be able to return to water the steam inside the second internal channels 66 generated due to heat exchange with the cathode gas and again supply it to the second internal channels 66. Below, this point of difference will be focused on in the explanation.

Figure 5:
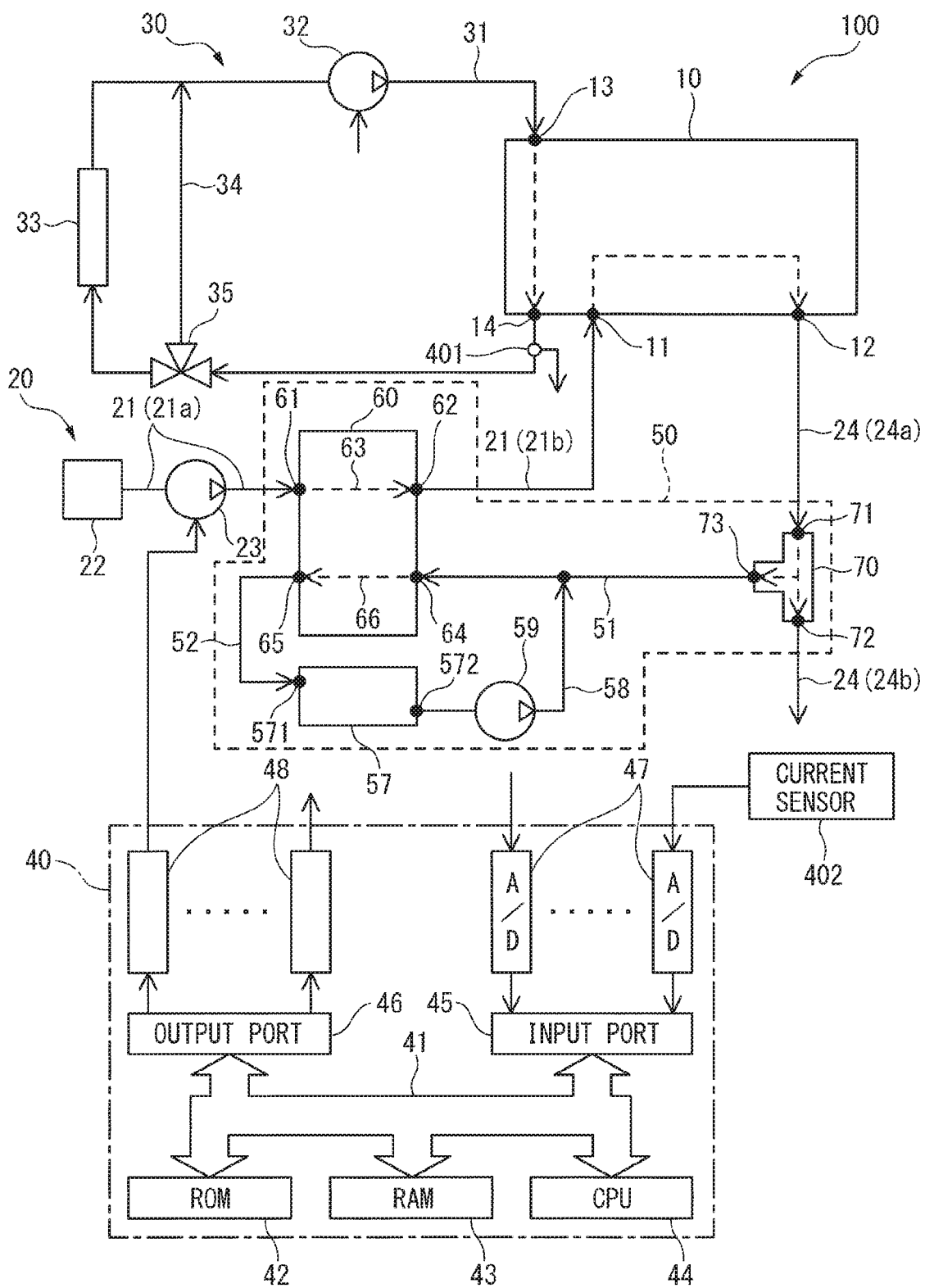
FIG. 5 is a schematic view of the configuration of a fuel cell system according to a third embodiment of the present disclosure.

FIG. 5 is a schematic view of the configuration of a fuel cell system 100 according to the present embodiment.

As shown in FIG. 5, the cathode gas cooling system 50 according to the present embodiment comprises, in addition to an intercooler 60, gas-liquid separator 70, discharged water supply pipe 51, and steam discharge pipe 52, a condenser 57, discharged water return pipe 58, and discharged water pump 59.

The other end of the steam discharge pipe 52 according to the present embodiment, unlike in the first embodiment, is not opened to the atmosphere but is connected to a steam inlet part 571 of the condenser 57.

The condenser 57 comprises the steam inlet part 571 and a discharged water takeout part 572. The condenser 57 is configured so as to condense the steam which flowed in from the steam inlet part to return it to water which it then stores inside it and so as to take out that water from the discharged water takeout part in accordance with need.

The discharged water return pipe 58 is a pipe for returning the water inside the condenser 57 to the discharged water supply pipe 51 for reuse. One end is connected to the discharged water takeout part 572 of the condenser 57, while the other end is connected to the discharged water supply pipe 51.

The discharged water pump 59 is provided in the discharged water return pipe 58. The discharged water pump 59 sucks in water from inside the condenser 57, takes it out from a discharged water takeout part, and supplies it to the discharged water supply pipe 51.

The fuel cell system 100 according to the present embodiment explained above comprises a fuel cell stack 10 (fuel cell), a cathode compressor 23 for compressing the cathode gas and supplying it to the fuel cell stack 10 (compressor), and a cathode gas cooling system 50 for cooling the cathode gas before being compressed by the cathode compressor 23 and supplied to the fuel cell stack 10.

Further, the cathode gas cooling system 50 comprises an intercooler 60 (heat exchanger) having first internal channels 63 into which cathode gas flows and second internal channels 66 to which water discharged from the fuel cell stack 10 is supplied and using the latent heat of vaporization of water flowing through the second internal channels 66 to cool the cathode gas flowing through the first internal channels 63 and is configured so as to not use the steam inside the second internal channels 66 produced due to heat exchange with the cathode gas flowing through the first internal channels 63 to humidify the cathode gas but return the steam to water and again supply it to the second internal channels 66.

Specifically, the cathode gas cooling system 50 is configured comprising a gas-liquid separator 70 separating the water in the cathode off-gas discharged from the fuel cell stack 10, a discharged water supply pipe 51 for supplying water separated by the gas-liquid separator 70 to the second internal channels 66 (water feed passage), steam discharge pipe 52 into which steam generated in the second internal channels 66 due to heat exchange with the cathode gas flowing through the first internal channels 63 is discharged (steam discharge passage), condenser 57 returning to water the steam discharged into the steam discharge pipe 52, and discharged water return pipe 58 for supplying the water returned from steam by the condenser 57 to the discharged water supply pipe 51 for reuse (water return passage).

Even if configuring the cathode gas cooling system 50 in this way, effects similar to the first embodiment are obtained. In addition, steam discharged from the second internal channels 66 can be returned to water for reuse, so the amount of water able to be supplied to the second internal channels 66 can be increased. For this reason, the cooling performance of the intercooler 60 can be improved more.

Fourth Embodiment

Next, a fourth embodiment of the present disclosure will be explained. The present embodiment differs in configuration of the intercooler 60 from the first embodiment in the point that the insides of the second internal channels 66 of the intercooler 60 are divided into two independent channels (first independent channels 66a and second independent channels 66b). Below, this point of difference will be focused on in the explanation.

Figure 6:
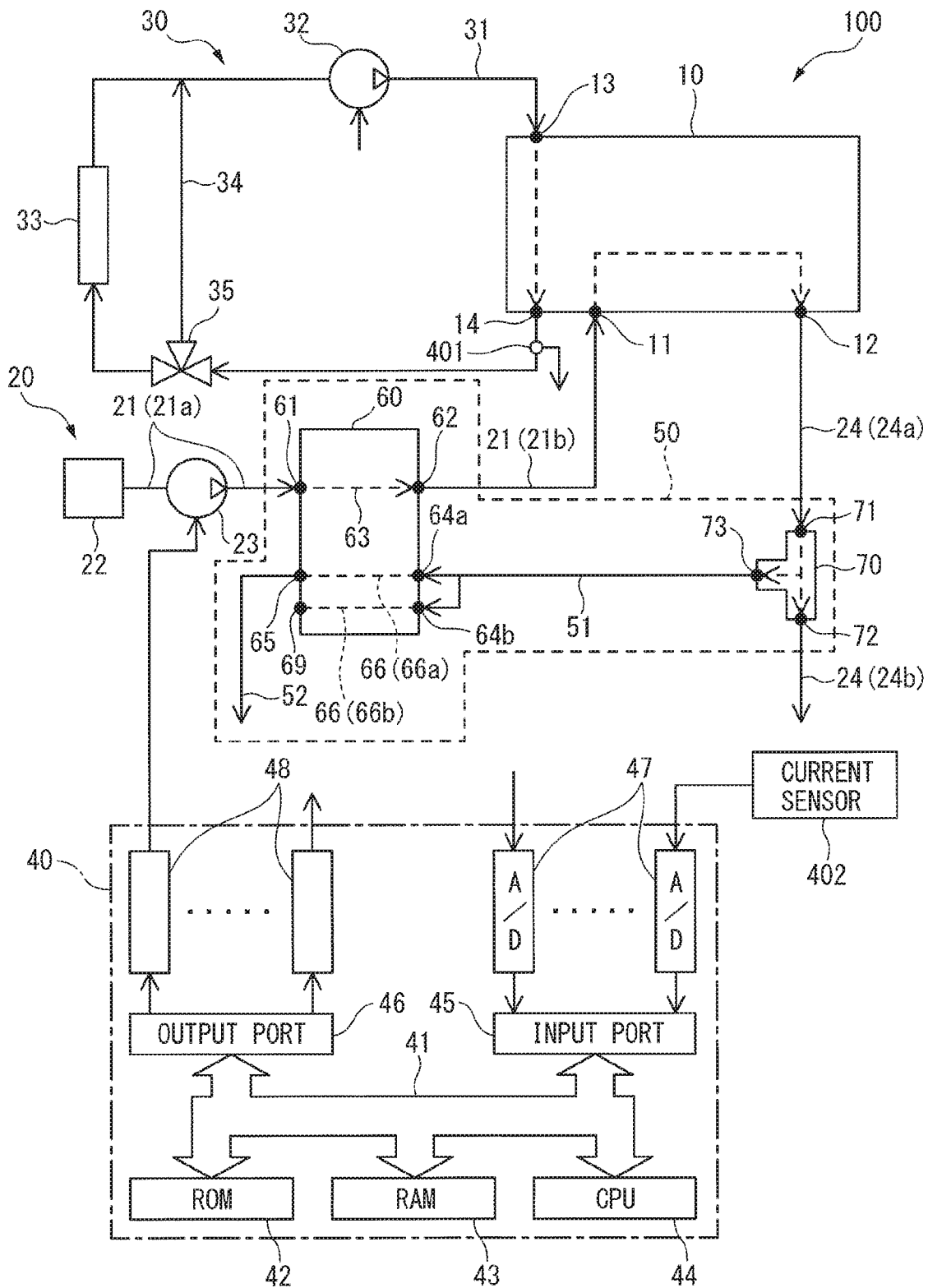
FIG. 6 is a schematic view of the configuration of a fuel cell system according to a fourth embodiment of the present disclosure.

FIG. 6 is a schematic view of the configuration of a fuel cell system 100 according to the present embodiment.

As shown in FIG. 6, in the intercooler 60 according to the present embodiment, the second internal channels 66 are divided by later explained dividing walls 90 (see FIG. 7) into two independent channels of first independent channels 66a and second independent channels 66b. The intercooler 60 further comprises a first discharged water inlet part 64a, a second discharged water inlet part 64b, and an atmosphere opening port 69.

The first independent channels 66a are channels connecting the first discharged water inlet part 64a and the steam outlet part 65. The second independent channels 66b are channels connecting the second discharged water inlet part 64b and the atmosphere opening port 69.

Further, in the present embodiment, the other end of the discharged water supply pipe 51 is branched into two. The other end of one branch among these is connected to the first discharged water inlet part 64a, while the other end of the other branch is connected to the second discharged water inlet part 64b. The first independent channels 66a and second independent channels 66b are therefore able to be individually supplied with water.

Figure 7:
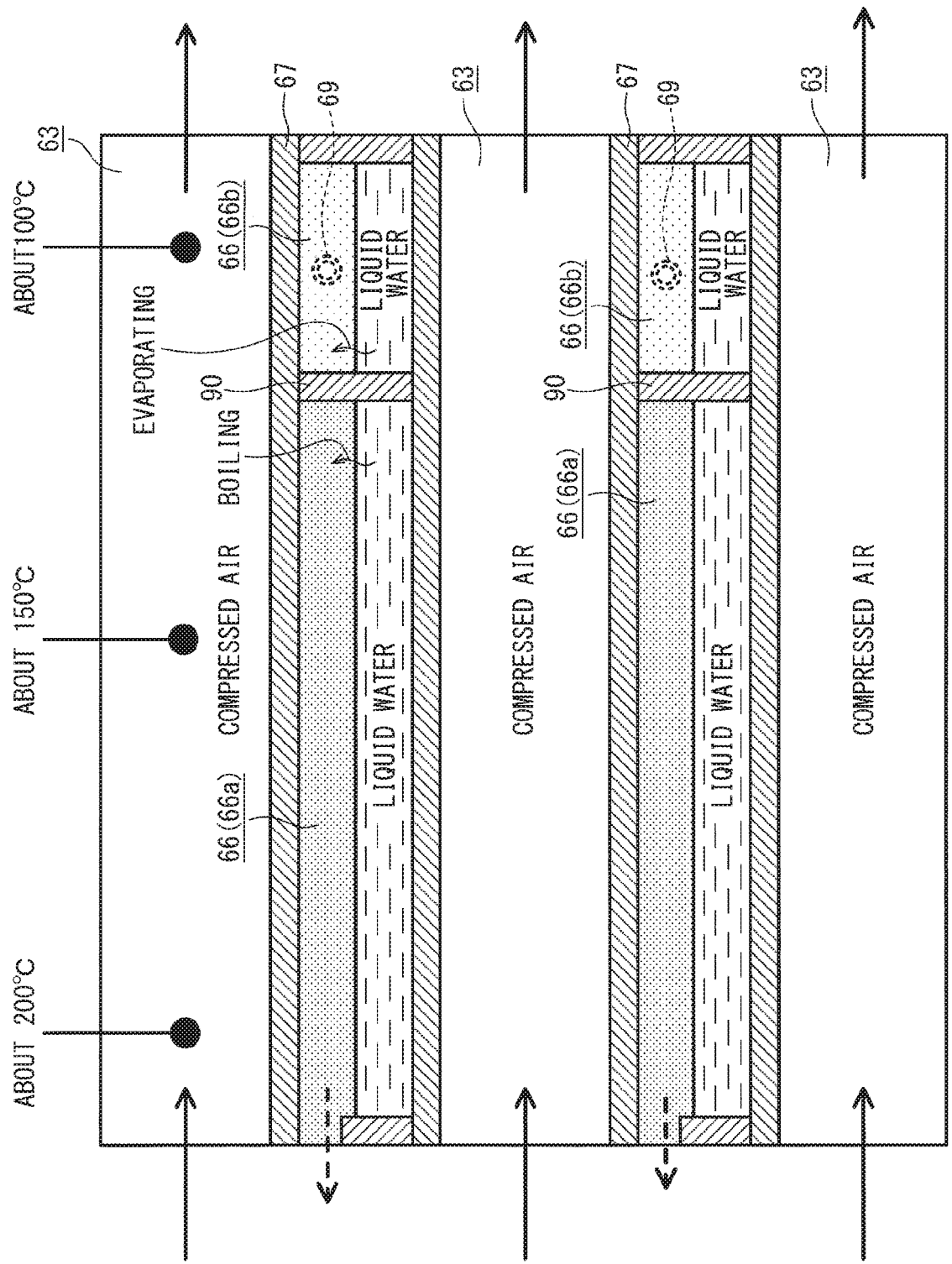
FIG. 7 is a schematic cross-sectional view showing part of the inside of an intercooler according to the fourth embodiment of the present disclosure.

FIG. 7 is a schematic cross-sectional view showing part of the inside of the intercooler 60 according to the present embodiment and shows a cross-section along the direction of flow of the compressed air flowing through the first internal channels 63.

As shown in FIG. 7, the intercooler 60 according to the present embodiment is provided with dividing walls 90 dividing the second internal channels 66 into first independent channels 66a and second independent channels 66b. The dividing walls 90 are formed so as to extend in a direction perpendicular to the direction of flow of the compressed air. Due to this, the heat of the relatively high temperature compressed air flowing through the upstream sides of the first internal channels (high temperature gas inlet part 61 sides) is conducted to the water supplied to the first independent channels 66a through the partitions 67. Further, the heat of the relatively low temperature compressed air flowing through the downstream sides of the first internal channels (low temperature gas outlet part 62 sides) is conducted to the water supplied to the second independent channels 66b through the partitions 67.

Below, referring to FIG. 7, the reason for providing such dividing walls 90 will be explained.

In the above-mentioned embodiments, basically the latent heat of vaporization when making the water inside the second internal channels 66 boil and changing it in phase to steam was utilized to cool the compressed air flowing through the first internal channels 63.

Here, the compressed air is cooled in the process of flowing through the first internal channels 63 toward the low temperature gas outlet part 62 side, so the temperature of the compressed air flowing through the downstream sides of the first internal channels 63 becomes relatively low compared with the temperature of the compressed air flowing through the upstream sides of the first internal channels 63. For this reason, the water inside the second internal channels 66 contacting the compressed air of the downstream sides of the first internal channels 63 through the partitions 67 becomes harder to boil. As a result, at the downstream side of the first internal channels 63, the cooling efficiency by the latent heat of vaporization is liable to become worse.

As opposed to this, according to the intercooler 60 according to the present embodiment, the dividing walls 90 extending in a direction perpendicular to the direction of flow of the compressed air can be used to divide the second internal channels 66 into first independent channels 66a and second independent channels 66b and thereby obtain the following effect.

That is, heat of the relatively high temperature compressed air flowing through the upstream sides of the first internal channels 63 is conducted to the water supplied to the first independent channels 66a through the partitions 67. For this reason, at the upstream sides of the first internal channels 63, the water inside the first independent channels 66a can be made to boil without problem, so the latent heat of vaporization when making water inside the first independent channels 66a boil to change it in phase to steam can be utilized to efficiently cool the compressed air.

On the other hand, in the present embodiment as well, in the same way as the intercooler 60 according to the above-mentioned embodiments, heat of the relatively low temperature compressed air flowing through the downstream sides of the first internal channels 63 is conducted to the water supplied to the second independent channels 66b through the partitions 67. For this reason, in the present embodiment as well, the water inside the second independent channels 66b adjacent to the compressed air of the downstream sides of the first internal channels 63 through the partitions 67 becomes harder to boil.

However, in the present embodiment, dividing walls 90 are used to divide the second internal channels 66 into two completely independent channels (first independent channels 66a and second independent channels 66b). Further, the second independent channels 66b are provided with an atmosphere opening port 69 which opens the second independent channels 66b to the atmosphere. For this reason, it is also possible to use the latent heat of vaporization when making the water inside the second independent channels 66b evaporate and changing it in phase to steam so as to cool the compressed air flowing through the first internal channels 63.

Note that in the present embodiment, "evaporation" shall refer to the phenomenon of water vaporizing from the surface to become steam which then diffuses into the air. Further, "boiling" shall refer to the phenomenon where water also vaporizes from the inside to become steam which diffuses into the air.

Here, in order for the water inside the second internal channels 66 to evaporate, the amount of steam inside the air inside the second internal channels 66 has to be less than the saturated steam amount. Further, the smaller the amount of steam in the air (more specifically the larger the difference in steam concentration with the water surface), the faster the evaporation rate.

However, the intercooler 60 according to the embodiments explained above was not provided with the dividing walls 90, so the steam produced due to boiling due to heat exchange with the compressed air flowing through the upstream sides of the first internal channels 63 ended up filling the insides of the second internal channels 66 and the amount of steam in the air inside the second internal channels 66 basically became the saturated steam amount. This is because the amount of steam produced due to boiling basically becomes greater than the amount of steam discharged from the steam outlet part 65. For this reason, in the case of the intercooler 60 according to the embodiments explained above, the water inside the second internal channels 66 could not be made to evaporate.

As opposed to this, in the present embodiment, the second internal channels 66 are divided by the dividing walls 90 into two completely independent channels (first independent channels 66a and second independent channels 66b), so the steam produced by boiling in the first independent channels 66a due to the heat exchange with the relatively high temperature compressed air flowing through the upstream sides of the first internal channels 63 does not flow into the second independent channels 66b but is discharged from the steam outlet part 65 to the steam discharge pipe 52. Further, the second independent channels 66b are open to the atmosphere through the atmosphere opening port 69, so the amount of steam in the air inside the second independent channels 66b basically becomes less than the saturated steam amount.

For this reason, in the present embodiment, it is possible to make part of the water in the second independent channels 66b, which is hard to make evaporate, evaporate and possible to use the latent heat of vaporization at that time to cool the remaining water inside the second independent channels 66b. If utilizing the latent heat of vaporization when making the water inside the second internal channels 66 boil so as to cool the compressed air like in the intercooler 60 according to the different embodiments explained above, it is necessary to make the temperature of the partitions 67 rise to the boiling point of water or more, so it was difficult to cool compressed air to not more than the boiling point of water.

As opposed to this, according to the present embodiment, even if the temperature of the partitions 67 is not more than the boiling point of water, it is possible to make the water inside the second internal channels 66 evaporate to lower the temperature of the water and due to this lower the temperature of the partitions 67 to not more than the boiling point of water. For this reason, it is possible to lower the compressed air to a temperature of not more than the boiling point of water.

The intercooler 60 (heat exchanger) of the cathode gas cooling system 50 according to the present embodiment explained above comprises dividing walls 90 dividing the second internal channels 66 into two independent channels of first independent channels 66a and second independent channels 66b.

The dividing walls 90 are provided inside the second internal channels 66 so that the first independent channels 66a are positioned at the upstream side in the direction of flow of cathode gas flowing through the first internal channels 63 and so that the second independent channels 66b are positioned at the downstream side in the direction of flow of cathode gas flowing through the first internal channels 63. Specifically, the dividing walls 90 are provided inside the second internal channels 66 so as to extend in a direction perpendicular to the direction of flow of cathode gas flowing through the first internal channels 63. Further, the second independent channels 66b are provided with an atmosphere opening port 69 communicating with the atmospheric space.

Due to this, it is possible to make part of the water inside the second independent channels 66b, which is difficult to make to boil since heat is exchanged with the relatively low temperature compressed air flowing through the downstream sides of the first internal channels 63, evaporate. The latent heat of vaporization at this time can be used to cool the remaining water inside the second independent channels 66b. For this reason, even if the temperature of the partitions 67 is not more than the boiling point of water, it is possible to make the water inside the second internal channels 66 evaporate to make the temperature of the water fall and due to this possible to make the temperature of the partitions 67 fall to not more than the boiling point of water. Therefore, it is possible to lower the compressed air to a temperature of the boiling point of water or less, so it is possible to further improve the cooling performance of the intercooler 60.

Above, embodiments of the present disclosure were explained, but the above embodiments only show some of the examples of application of the present disclosure and are not meant to limit the technical scope of the present disclosure to the specific constitutions of the embodiments.

Figure 8:
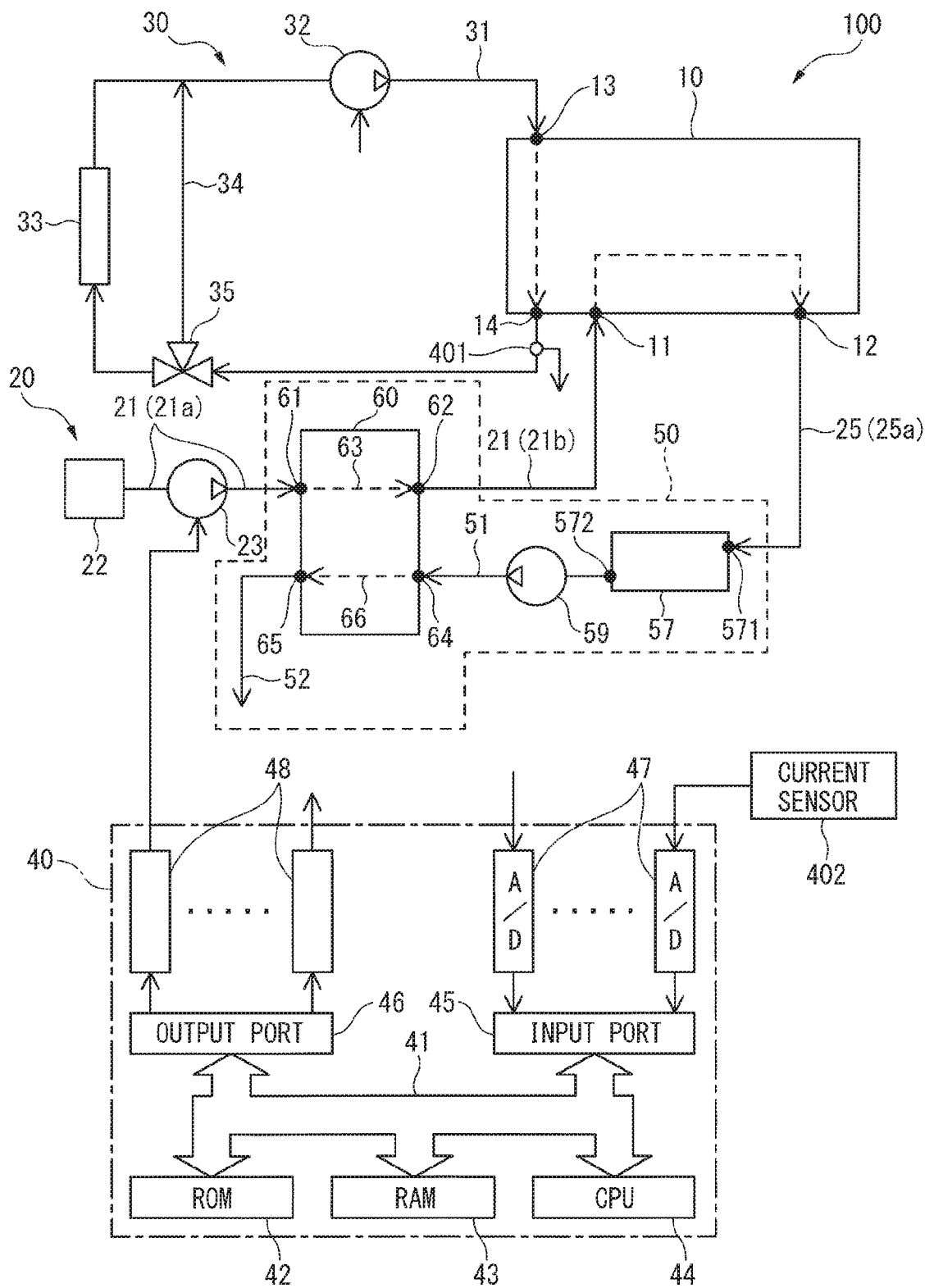
FIG. 8 is a schematic view of the configuration of a fuel cell system according to a first modification of the first embodiment of the present disclosure.

For example, the gas-liquid separator 70 which was used for separating water from the cathode off-gas like in the fuel cell system 100 according to the first modification of the first embodiment shown in FIG. 8 may be replaced with the condenser 57 explained in the third embodiment and the discharged water supply pipe 51 may be provided with the discharged water pump 59 explained in the third embodiment. Even if configuring the cathode gas cooling system 50 in this way, it is possible to obtain effects similar to the first embodiment.

Figure 9:
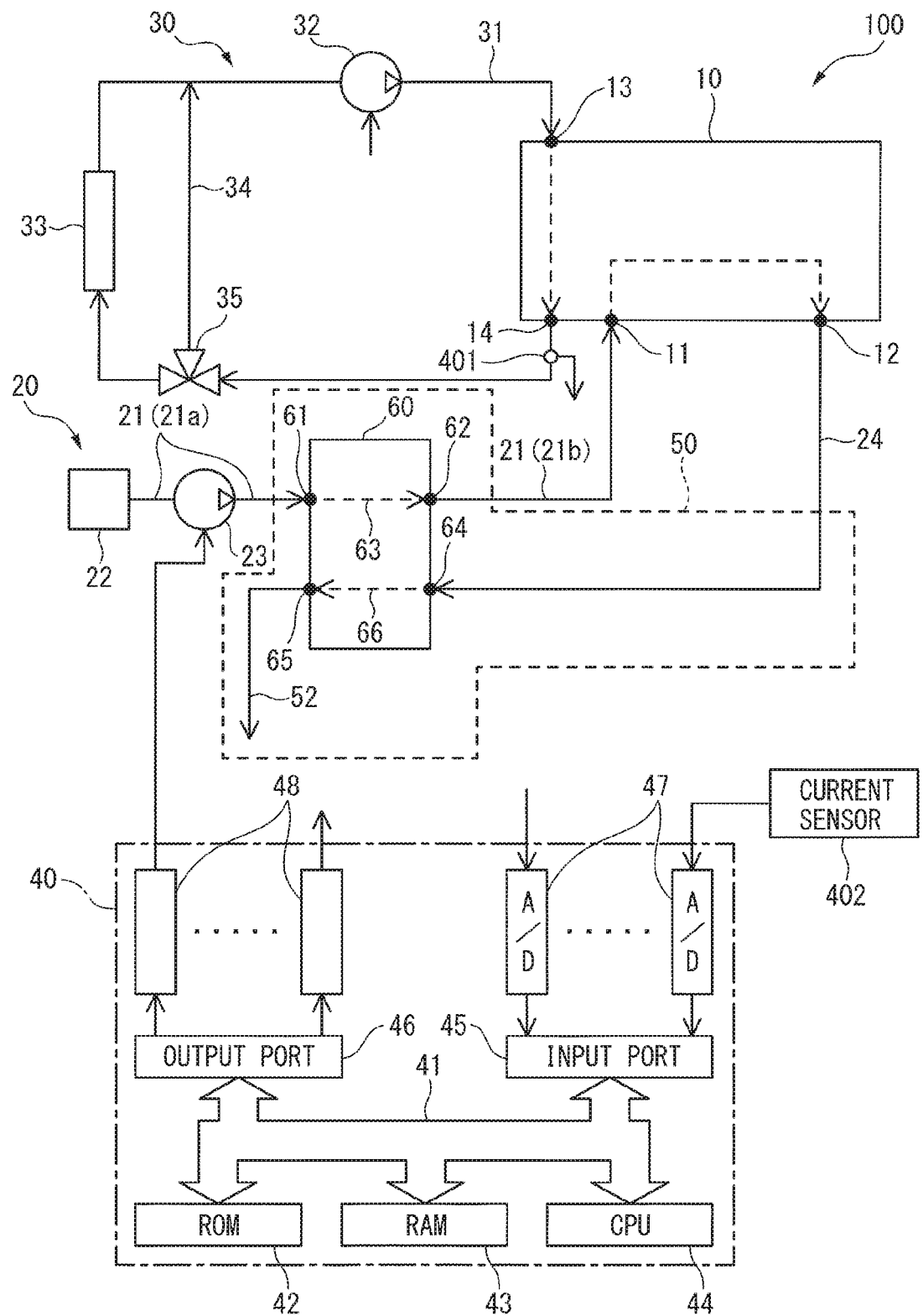
FIG. 9 is a schematic view of the configuration of a fuel cell system according to a second modification of the first embodiment of the present disclosure.

Further, the cathode off-gas contains liquid water as well like in the fuel cell system 100 according to the second modification of the first embodiment shown in FIG. 9, so it is also possible not to use the gas-liquid separator 70 but directly connect the other end of the cathode off-gas discharge passage 24 to the discharged water inlet part 64 of the intercooler 60. Even if configuring the cathode gas cooling system 50 in this way, effects similar to the first embodiment can be obtained. Note that when configuring the cathode gas cooling system 50 in this way, it is desirable to enable the cathode off-gas flowing through the inside of the cathode off-gas discharge passage 24 to be cooled by forming the cathode off-gas discharge passage 24 by members with a high heat conduction rate or further providing fins at the outer circumferential surface of the cathode off-gas discharge passage 24 to improve the heat dissipating performance of the cathode off-gas discharge passage 24.

Figure 10:
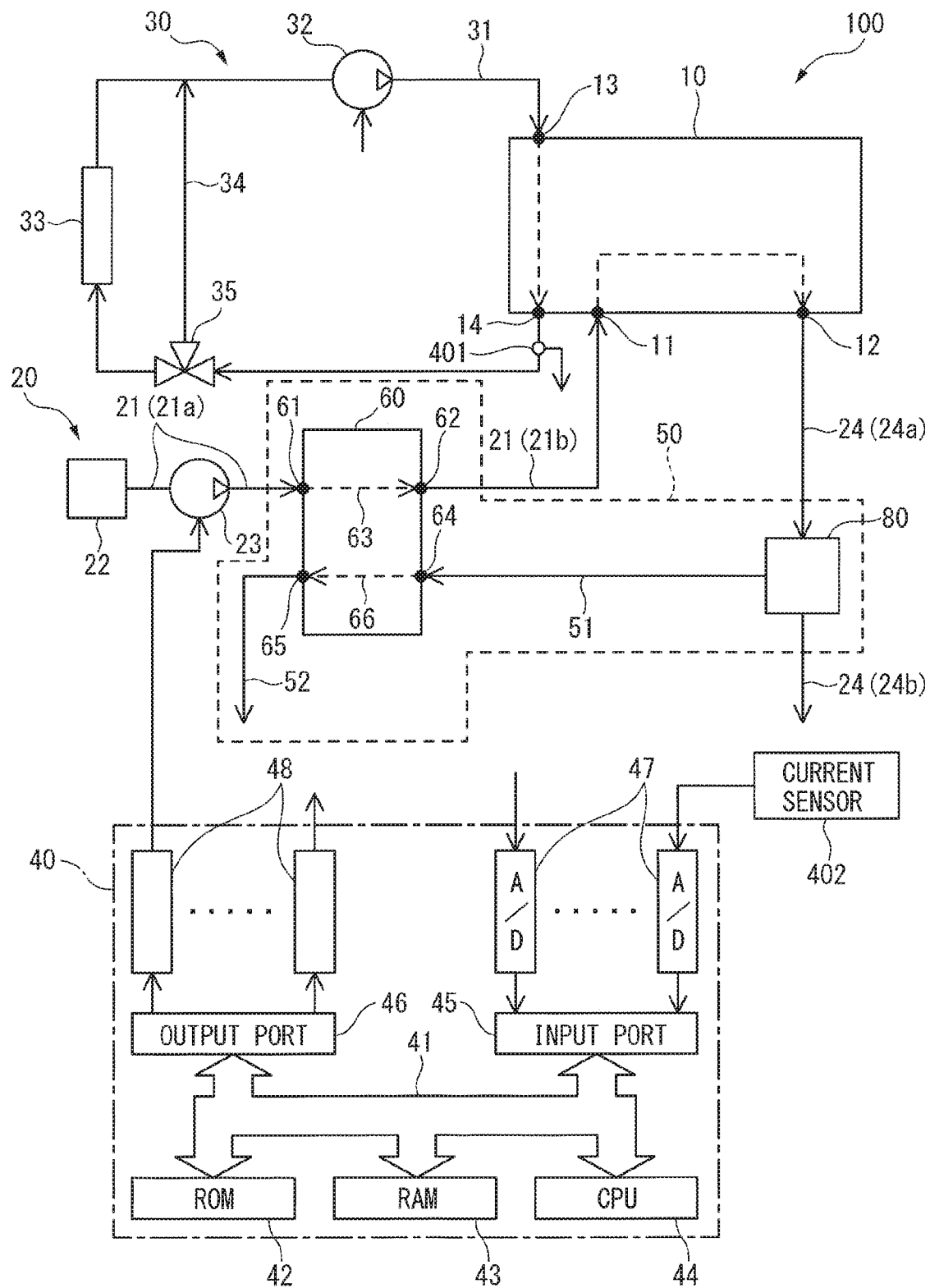
FIG. 10 is a schematic view of the configuration of a fuel cell system according to a third modification of the first embodiment of the present disclosure.

Further, the gas-liquid separator 70 may be replaced with the turbine 80 of the recycler like in the fuel cell system 100 according to the third modification of the first embodiment shown in FIG. 10. Even if configuring the cathode gas cooling system 50 in this way, it is possible to use the cathode off-gas to drive the turbine 80, use adiabatic expansion to cool the off-gas to return it to water, and supply the water to the second internal channels 66. Further, it is possible to use the turbine 80 to drive a generator (not shown) to generate electric power and charge a battery etc. with the generated electric power, so it is possible to improve the fuel efficiency (electric efficiency) of the fuel cell system 100.

Further, in the first embodiment and second embodiment, it is also possible to configure them to provide a turbine 80 of a recycler at the steam discharge pipe 52 and use the steam to drive the turbine 80 to generate electric power.

Further, in the above embodiments, it is also possible to provide the downstream side supply pipe 21b with a humidifier for humidifying the cathode gas.

Further, in the fourth embodiment, it is also possible to supply dry air or outside air to the second independent channels 66b. Due to this, it is possible to increase the difference in steam concentration between the water (water surface) and air inside the second independent channels 66b, so it is possible to promote the evaporation of water inside the second independent channels 66b. Further, it is possible to use the dry air or outside air supplied to the inside of the second independent channels 66b to stir the water inside the second internal channels 66, so due to this, it is possible to promote contact of the water with the air to promote evaporation.

Note that the above embodiments and modifications may be suitably freely combined.

The invention claimed is:
1. A fuel cell system comprising:
a fuel cell;
a compressor for compressing cathode gas and supplying it to the fuel cell; and
a cathode gas cooling system for cooling cathode gas after being compressed by the compressor and before being supplied to the fuel cell, wherein
the cathode gas cooling system comprises a heat exchanger having first internal channels into which cathode gas flows and second internal channels to which water discharged from the fuel cell is supplied and using the latent heat of vaporization of the water flowing through the second internal channels to cool the cathode gas flowing through the first internal channels,
the first internal channels and second internal channels being made independent channels inside the heat exchanger so that steam produced inside the second internal channels due to heat exchange with the cathode gas flowing through the first internal channels does not flow into the first internal channels, wherein the fuel cell system further comprises:
a refrigerant circulation passage in which refrigerant cooling the fuel cell circulates; and
a radiator provided in the refrigerant circulation passage and cooling the refrigerant, and
the cathode gas cooling system is configured so as to be able to supply part of the refrigerant circulating through the refrigerant circulation passage to third internal channels formed inside the heat exchanger and use the refrigerant flowing through the third internal channels as well to cool the cathode gas flowing through the first internal channels.

2. The fuel cell system according to claim 1, wherein
the cathode gas cooling system comprises:
a branch passage branched off from the refrigerant circulation passage and communicating with third internal channels;
a flow rate control valve provided in the branch passage; and
a control device controlling the opening degree of the flow rate control valve to control the flow rate of the refrigerant supplied to the third internal channels based on the load of the fuel cell, and
the control device makes the opening degree of the flow rate control valve larger than fully closed when the load of the fuel cell is less than a predetermined load.

3. The fuel cell system according to claim 2, wherein
the control device increases the opening degree of the flow rate control valve the lower the load when the load of the fuel cell is less than a predetermined load.

\* \* \* \* \*